United States Patent Office 2,768,184
Patented Oct. 23, 1956

2,768,184

PROCESS FOR PREPARING 11-HYDROXY-STEROIDS

Leopold Ruzicka, Hans Heusser, and Oskar Jeger, Zurich, Switzerland, assignors to Ciba Pharmaceutical Products, Inc.

No Drawing. Application December 13, 1951, Serial No. 261,583

Claims priority, application Switzerland December 22, 1950

3 Claims. (Cl. 260—397.1)

The present invention is concerned with a new process leading to new compounds which make it possible to synthesize therapeutically active steroids containing oxygen in the 11-position.

The steroids with oxygen in 11-position are of great importance. An important representative of this class of compounds is for example cortisone, $\Delta^4$-3,11,20-trioxo-17$\alpha$,21-dihydroxy-pregnene. The hitherto known processes for the synthetic production of such steroids use as starting materials desoxycholic acid and its derivatives, that is to say compounds which possess a hydroxyl group in 12-position. It has been shown however that the transfer of oxygen from the 12- to the 11-position is a very tedious process requiring several operations. In addition the desoxycholic acid used as starting material is only obtainable in relatively limited quantity, so that for example it is practically impossible to manufacture the cortisone required in therapy in sufficient quantity by this method. A requirement therefore exists for new sources for the manufacture of this medicament. The easily available sterols, such as ergosterol, stigmasterol or sitosterol, but more especially cholesterol, have indeed for many years been important starting materials for the production of sex hormones. They have however hitherto been without importance for the production of compounds with oxygen in the 11-position of the intact steroid structure.

The present invention is based on the observation that by starting from the above-mentioned sterols or conversion products thereof, compounds of the steroid series with oxygen in the 11-position can be obtained when a $\Delta^{7,8:9,11}$-steroid is treated with an agent capable of introducing oxygen, the resultant $\Delta^{7,8}$-9,11-oxido compound is isomerized, an oxidizing agent is caused to act on the $\Delta^{8,9}$-7,11-dihydroxy-compound formed, the resultant $\Delta^{8,9}$-7-oxo-11-hydroxy-steroid is treated with a hydrogenating agent and the oxo-group in 7-position is removed by reduction.

The process is illustrated by the following diagram of partial formulae:

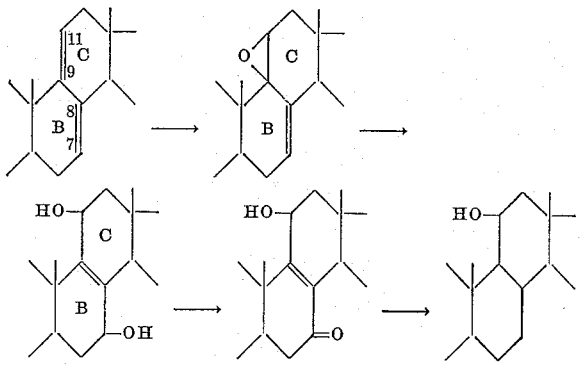

An object of the present invention are 11-hydroxy-steroids of the cholestane, stigmastane and ergostane series. These compounds are new and are intended for use as intermediate products for the preparation of 11-oxo-steroids and 11-hydroxy-steroids having a hormone action. Thus, e. g., the present invention is a step in the preparation of the methyl-3$\alpha$-acetoxy-11-oxo-cholanate (see e. g. Example 5 of copending application S. N. 261,581, filed on even date herewith) which is a recognized and well known intermediate for the production of the highly active hormone 11-dehydro-corticosterone (cf. Wettstein & Meystre: Helv. Chim. Acta, vol. 30, pp. 1262–1265 (1947)). Another object of the invention is a new process for the manufacture of an 11-hydroxy-steroid. It comprises the reduction of a $\Delta^{8,9}$-7-oxo-11-hydroxy-steroid by the Clemmensen method.

These $\Delta^{8,9}$-7-oxo-11-hydroxy-steroids belong to the cyclopentanopolyhydrophenanthrene or the polyhydrocrysene series. Particular importance is attached to the derivatives of cholestane, coprostane, sitostane, stigmastane, cholane, allocholane, pregnane, androstane and etiocholane. In addition to the aforementioned double bond, the starting materials may have other double bonds. They can be obtained, e. g. by partially oxidizing a $\Delta^{8,9}$-7,11-dihydroxy-steroid according to copending U. S. patent application Serial No. 261,582, filed December 13, 1951.

In the reduction by the method of Clemmensen which has to be performed according to the present invention the agents and conditions known as specific for that reaction are applied. Thus, the reaction can be carried out e. g. with zinc amalgam and a mixture of glacial acetic acid and hydrochloric acid.

The following examples illustrate the invention, the relation between parts by weight and parts by volume being the same as that between the gram and the cubic centimeter:

*Example 1*

1 part by weight of $\Delta^{8,9}$-3$\beta$-acetoxy-7-oxo-11-hydroxy-cholestene (prepared according to U. S. patent application Serial No. 261,582, filed December 13, 1951) is dissolved in 50 parts by volume of glacial acetic acid and slowly added to a slightly refluxing mixture of 5 parts by volume of concentrated hydrochloric acid and 50 parts by volume of glacial acetic acid, in which amalgamated zinc prepared from 5 parts by weight of granulated zinc and 2.5 parts by weight of mercuric chloride has been introduced immediately before the addition of the cholestene derivative. After the addition is complete the mixture is refluxed for 6 hours, during which time 5 parts by volume of concentrated hydrochloric acid are added in small portions. The reaction mixture is then cooled and filtered from unreacted zinc. The residue is washed with glacial acetic acid and the combined filtrates concentrated in vacuo to a small volume, diluted with 150 parts by volume of chloroform and washed with water, sodium bicarbonate solution and water, dried and evaporated. The remaining half solid residue is reacetylated by refluxing for 10 hours in glacial acetic acid, the crude product obtained is chromatographed over aluminum oxide. There is obtained first a small crystalline fraction which consists of cholestanol acetate and additional crystalline fractions, which can be recrystallized from methanol or a mixture of acetone and water and which have the formula

and consist of 3$\beta$-acetoxy-11-hydroxy-cholestane. By oxidation with chromic acid in glacial acetic acid 3$\beta$-acetoxy-11-oxo-cholestane of melting point 152° C. is obtained.

Example 2

0.5 part by weight of methyl $\Delta^{8,9}$-3α-acetoxy-7-oxo-11-hydroxy-cholenate (prepared according to U. S. patent application Serial No. 261,582, filed December 13, 1951) is dissolved in 50 parts by volume of glacial acetic acid. To this solution amalgamated zinc, prepared from 2.5 parts by weight of zinc turnings and 1.2 parts by weight of mercuric chloride, and 2.5 parts by volume of concentrated hydrochloric acid are added and the mixture slowly heated to the boiling point and kept under reflux for 6 hours. Another 2.5 parts by volume of concentrated hydrochloric acid are added during the reaction time in small portions. The reaction mixture is then allowed to cool to room temperature, filtered, evaporated to a small volume, diluted with chloroform and washed several times with water to remove acetic and hydrochloric acid, dried and evaporated in vacuo. The residue is reesterified with diazomethane and reacetylated with 1.1 equivalents of acetic anhydride in pyridine at 80° C. for 2 hours. The resulting product is purified by chromatography over alumina. The methyl 3α-acetoxy-11-hydroxy-cholenate thus obtained can be oxidized to the known methyl 3α-acetoxy-11-oxo-cholenate of melting point 131–133° C.

Example 3

1.2 parts by weight of $\Delta^{8,9:22,23}$-3β-acetoxy-7-oxo-11-hydroxy-ergostadiene (prepared according to U. S. patent application Serial No. 261,582, filed December 13, 1951) are dissolved in 60 parts by volume of glacial acetic acid and slowly dropped into a slightly refluxing mixture of 6 parts by volume of concentrated hydrochloric acid and 60 parts by volume of glacial acetic acid, to which amalgamated zinc prepared from 6 parts by weight of zinc turnings and 3 parts by weight of mercuric chloride is added just before the first mentioned acetic acid solution is dropped in. The reaction mixture is then further treated as described in Example 1 and yields after partial reacetylation and chromatographic purification $\Delta^{22,23}$-3β-acetoxy-11-hydroxy-ergostene.

By treating $\Delta^{8,9:22,23}$-3β-acetoxy-7-oxo-11-hydroxy-stigmastadiene with amalgamated zinc and acid in a completely analogous manner $\Delta^{22,23}$-3β-acetoxy-11-hydroxy-stigmastene is obtained.

Example 4

0.6 part by volume of $\Delta^{8,9}$-3β,20-diacetoxy-7-oxo-11-hydroxy-allo-pregnene (prepared according to U. S. patent application Serial No. 261,582, filed December 13, 1951) is dissolved in 80 parts by volume of ethanol and added in portions, over a period of 3–4 hours to a refluxing mixture of 5 parts by volume of concentrated hydrochloric acid, 40 parts by volume of ethanol and amalgamated zinc, prepared from 4 parts by weight of granulated zinc and 2 parts by weight of mercuric chloride under a hydrogen atmosphere. After the addition is complete the mixture is refluxed for 10 hours during which period 5 parts by volume of concentrated hydrochloric acid are added in portions. The mixture is then cooled, filtered from unreacted zinc and diluted with 200 parts by volume of chloroform. The aqueous layer is separated and again extracted with chloroform. The combined chloroform solutions are washed with water, bicarbonate and water, dried and evaporated. The crude 3β,11,20-trihydroxy-allo-pregnane thus obtained can be purified by chromatography. It can be oxidized with chromic acid to the known 3,11,20-trioxo-allo-pregnane of melting point 211–213° C.

What is claimed is:

1. A process for the conversion of a member selected from the group consisting of $\Delta^{8,9}$-3-lower alkylcarbonyloxy-7-oxo-11-hydroxy-cholestenes, $\Delta^{8,9}$-3-lower alkylcarbonyloxy-7-oxo-11-hydroxy-cholenes, $\Delta^{8,9}$-3-lower alkylcarbonyloxy-7-oxo-11-hydroxy-ergostadienes, $\Delta^{8,9}$-3-lower alkylcarbonyloxy-7-oxo-11-hydroxy-stigmastadienes and $\Delta^{8,9}$-3-lower alkylcarbonyloxy-7-oxo-11-hydroxy-allopregnenes into the corresponding 11-hydroxy compound, unsubstituted in the 7-position and saturated in the 8,9-position, which comprises treating the said member of the said group with amalgamated zinc and hydrochloric acid.

2. A process for the conversion of a lower alkyl $\Delta^{8,9}$-3-lower alkylcarbonyloxy-7-oxo-11-hydroxy-cholenate to the corresponding lower alkyl 3-lower alkylcarbonyloxy-11-hydroxy-cholanate, which comprises treating the lower alkyl $\Delta^{8,9}$-3-lower alkyl carbonyloxy-7-oxo-11-hydroxy-cholenate with amalgamated zinc and hydrochloric acid.

3. A process for the conversion of methyl $\Delta^{8,9}$-3α-acetoxy-7-oxo-11-hydroxy-cholenate to the corresponding methyl 3α-acetoxy-11-hydroxy-cholanate, which comprises treating the methyl $\Delta^{8,9}$-3α-acetoxy-7-oxo-11-hydroxy-cholenate with amalgamated zinc and hydrochloric acid.

References Cited in the file of this patent

UNITED STATES PATENTS 2,321,598   Hoehn _____ June 15, 1943

OTHER REFERENCES

Fieser et al.: Org. Chem., 2nd ed., 1950, pp. 579–81.
Organic Reactions, vol. 1, pp. 155–209 (1942).
Fieser et al.: Natural Products Related to Phenanthrene, 3rd ed., p. 425 (1949).